United States Patent [19]
Stobbs et al.

[11] Patent Number: 5,631,669
[45] Date of Patent: May 20, 1997

[54] POINTING DEVICE WITH INTEGRAL MICROPHONE

[76] Inventors: Gregory A. Stobbs; Beth H. Stobbs, both of 971 Charrington, Bloomfield Hills, Mich. 48301

[21] Appl. No.: 412,594

[22] Filed: Mar. 29, 1995

Related U.S. Application Data

[63] Continuation of Ser. No. 191,956, Feb. 4, 1994, abandoned.

[51] Int. Cl.⁶ .................................................. G09G 5/08
[52] U.S. Cl. ......................... 345/163; 345/156; 381/122
[58] Field of Search ................................. 345/156, 158, 345/163–166, 167; 381/26, 42, 48, 92, 122, 169

[56] References Cited

U.S. PATENT DOCUMENTS

| | | | |
|---|---|---|---|
| 4,514,726 | 4/1985 | Whetstone et al. | 345/158 |
| 4,776,016 | 10/1988 | Hansen | 381/42 |
| 4,817,153 | 3/1989 | Fernandez | 381/26 |
| 4,880,968 | 11/1989 | Kwang-Chien | 345/166 |
| 5,001,467 | 3/1991 | Chien | 345/166 |
| 5,063,289 | 11/1991 | Jasinski et al. | 345/163 |
| 5,202,929 | 4/1993 | Lemelson | 382/2 |
| 5,204,969 | 4/1993 | Capps et al. | 381/48 |
| 5,249,235 | 9/1993 | Davis, II et al. | 381/92 |
| 5,287,119 | 2/1994 | Drumm | 345/158 |
| 5,339,095 | 8/1994 | Redford | 345/158 |
| 5,402,518 | 3/1995 | Lowery | 395/2.1 |
| 5,469,193 | 11/1995 | Giobbi et al. | 345/157 |

FOREIGN PATENT DOCUMENTS 1119821  5/1989  Japan.

Primary Examiner—Steven Saras
Attorney, Agent, or Firm—Harness, Dickey & Pierce

[57] ABSTRACT

The pointing device or mouse is provided with a microphone for speech input. The microphone can be muted when the device serves as a pointing device by manually activating a push button or by automatically activating a circuit responsive to the position of the device.

62 Claims, 3 Drawing Sheets

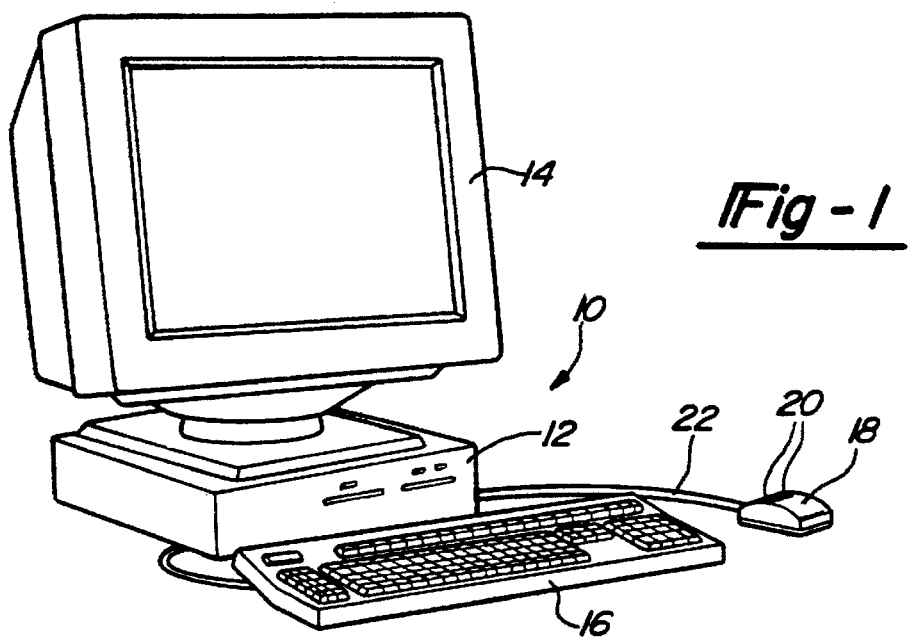
*Fig - 1*
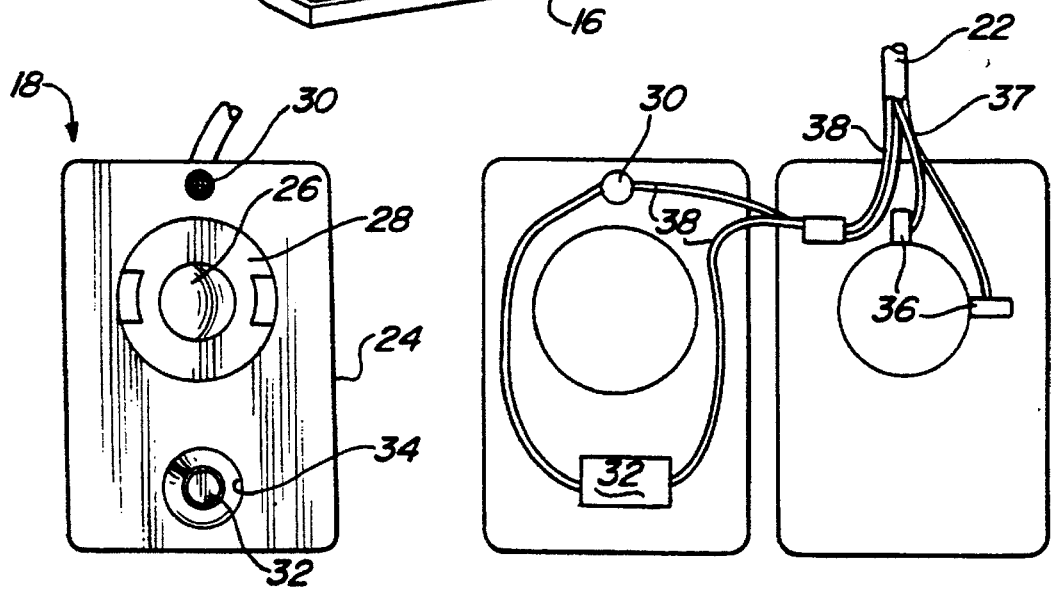
*Fig - 2*
*Fig - 3*
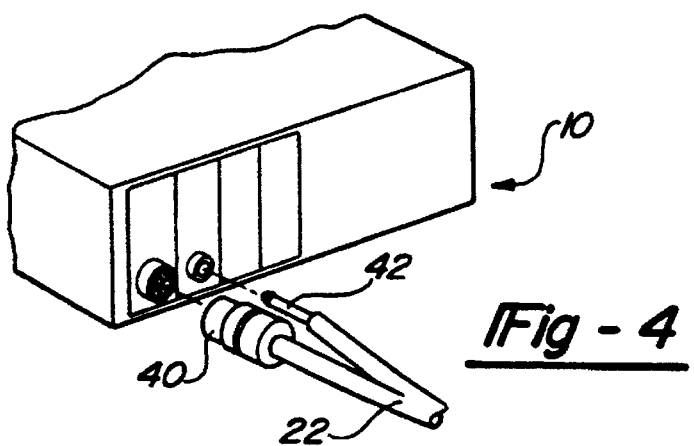
*Fig - 4*

5,631,669

POINTING DEVICE WITH INTEGRAL MICROPHONE

This is a continuation of U.S. patent application Ser. No. 08/191,956, filed Feb. 4, 1994, entitled "Pointing Device With Integral Microphone" now abandoned.

BACKGROUND AND SUMMARY OF THE INVENTION

The present invention relates generally to computer data input equipment. More particularly, the invention relates to a computer pointing device or mouse having integral microphone system for speech recognition processing.

Most personal computers today include a pointing device, such as a hand-manipulated mouse for controlling the screen cursor in making menu selections, data entry selections, performing graphic manipulations, blocking off regions of text in a document and the like. Often the mouse is used in conjunction with a data entry keyboard, which is used to enter alphanumeric text and to make program selections by pressing functions keys.

A newer form of data input and computer control is voice activation using speech recognition technology. Although still largely experimental today, it is expected that speech recognition technology will become increasingly important as a means of entering data and instructions into a computer. One principal problem with speech recognition technology today is that the speech recognition technology is highly dependent upon speaker dependent variables and acoustics. While great strides are continuing to be made, speech recognition technology requires complex signal processing techniques which are designed to standardize the input speech as much as possible, thereby making the speech recognizer's job easier. In short, it is desirable to eliminate as many variables as possible, so that the speech recognizing software will be able to do a better job.

In normalizing speech for computer recognition, microphone placement can be important. Ideally, room acoustic variations should be kept to a minimum. Although there are directional microphones available which can be used to minimize the effects of room acoustics, these microphones tend to be expensive and often times too large for the office environment. There has been some experimentation with placement of the microphone in the computer monitor or in a free-standing speaker enclosure. These solutions, however, require the operator to face the computer monitor or speaker while using them to input speech. Also, these solutions may require complex desensitizing and filtering circuitry in order to make them more immune to spurious room sounds and reverberations.

The present invention overcomes the shortcomings of existing microphone technology for speech input by integrating a small microphone within the pointing device or mouse. A great deal of convenience and functionality is obtained, since the user can readily pick up the mouse and speak directly into it, without the need to face in a particular direction or to worry about room acoustics. The microphone can be positioned in the underside of the mouse, where it will be unobstructed by the user's hand during use. To minimize false triggering a switch may be provided to mute the microphone when the mouse is in use as a pointing device.

For a more complete understanding of the invention, its objects and advantages, reference may be had to the following specification and to the accompanying drawings.

BRIEF DESCRIPTION OF THE DRAWINGS

FIG. 1 illustrates a computer system with speech input pointing device in accordance with the present invention;

FIG. 2 is a plan view of the underside of the speech input pointing device of the invention, illustrating one of the presently preferred embodiments;

FIG. 3 is a view of the device of FIG. 2 with the underside casing opened and inverted to reveal the internal components of the embodiment of FIG. 2;

FIG. 4 depicts one manner of connecting the device of FIG. 2 to the computer system;

DESCRIPTION OF THE PREFERRED EMBODIMENTS

Figure 5A:
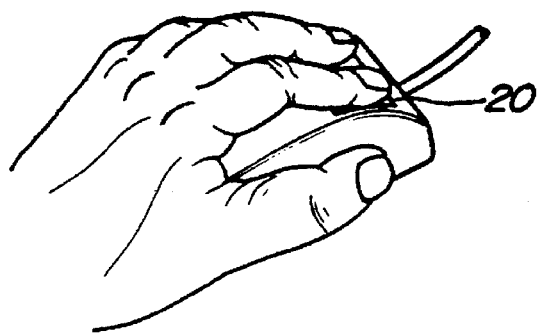
FIG. 5A shows the device in use as a pointing device.

Referring to FIG. 1, a computer system 10 is illustrated. The computer system includes a system unit or CPU unit 12, a monitor 14 and a keyboard 16. The pointing and speech input device of the invention is illustrated generally at 18. The device of the invention is connected by cable 22 to the CPU unit 12. Although a cable connection is illustrated in FIG. 1, the invention can be connected to computer system 10 through fiber optic cable or wireless transmission link. If a wireless transmission link is used it may be desirable to provide the speech input device with a compander circuit or noise reduction circuit to reduce the effects of hiss and noise introduced by the transmission system. In this regard, RF or infrared systems may be used to provide the transmission link. The pointing and speech input device 18 may include one or more push buttons 20 on the upper surface thereof, for performing conventional clicking and dragging operations as a mouse.

The presently preferred embodiment is physically configured to resemble a mouse and, if desired, the invention may be implemented by modifying an existing mouse design in accordance with the teachings herein. Referring to FIG. 2, the pointing and speech input device 18, as seen from its underside, comprises a generally hand-sized case 24, which may be made of molded plastic and approximately the size of a bar of soap. The device includes a rubber or plastic ball 26 retained by removable retaining ring 28 in the conventional fashion. Alternatively, the ball can be replaced by a suitable optical sensing system employing an optically encoded pad for providing X-Y information to an optical sensor. The underside of the case 24 has an aperture in which microphone 30 is positioned. A push button 32 is mounted on the underside of the case, preferably positioned along the longitudinal axis, as illustrated, so that it is equally accessible by the user's thumb, whether the user is right-handed or left-handed. Desirably, button 32 is disposed in a recess 34, so that the button will not be actuated when the device is placed on a surface for use as a pointing device. Recess 34 may be contoured, as illustrated, to conform more readily to a user's thumb, when the device is grasped as illustrated in FIG. 5B.

Referring to FIG. 3, the device is shown with its case opened up, in clam shell fashion, to reveal some of the additional interior components. Ball 26 has been removed in FIG. 3 to reveal the X axis and Y axis motion encoders 36. As illustrated these encoders are orthogonal and, in use, are selectively rotated clockwise and counterclockwise along their respective rotational axes by rolling of ball 26 in contact with them. Microphone 30 may be installed in the bottom portion of the housing, as illustrated and the microhone wires 38 are fed along with the X axis, Y axis and push button wires 37 through the common cable 22. Push button 32 is also preferably mounted on the underside of the housing, as shown, and electrically connected to the microphone to provide a push to talk/muting function.

The microphone wires and the associated pointing device wires are preferably fed through common cable 22, with separate plugs for attaching to the computer system's mouse port or serial port and also to the computer system's audio input port. Thus, in FIG. 4, the backside of computer system 10 is illustrated to show plug 40 connected to the computer mouse port and plug 42 connected to the computer audio input port. Naturally, the plug configuration is selected to match the configuration of the computer jacks.

Figure 5B:
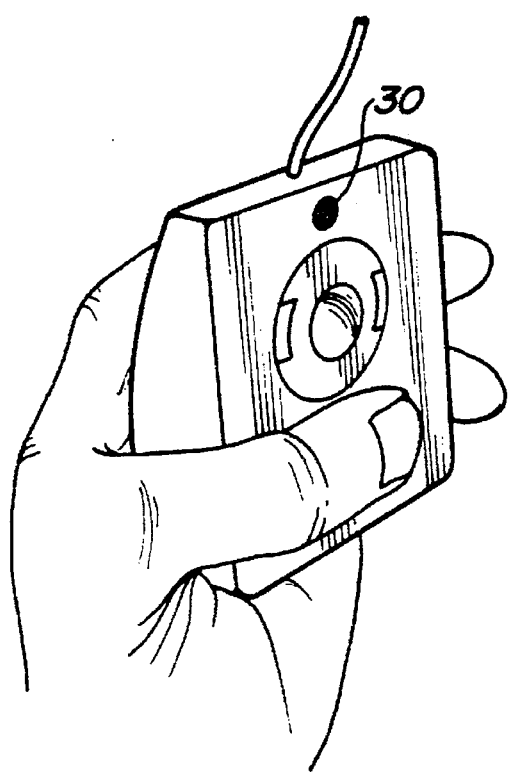
FIG. 5B is an illustration of the embodiment of FIG. 2 being grasped by the hand while activating the talk button.
Figure 5C:
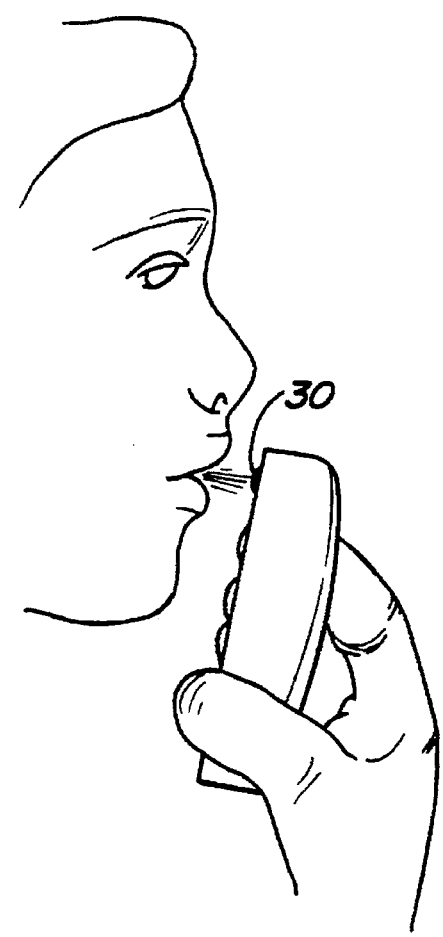
FIG. 5C shows the device in use as a speech input device.

The series of FIGS. 5A, 5B and 5C illustrate the device in use. In FIG. 5A the device is in use as a pointing device or mouse. As illustrated, the device is placed with buttons 20 face up so that ball 26 is in contact with a horizontal surface such as a desktop or mouse pad. When it is desired to enter speech input the device is lifted, as illustrated in FIG. 5B and the user's thumb wraps around the underside of the device to access the push button 32. Then, as shown in FIG. 5C, the user may speak into microphone 30 to input speech or audio into the computer.

Figure 6:
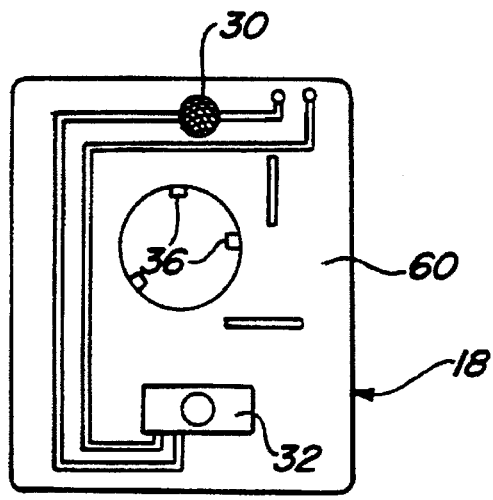
FIG. 6 depicts an alternate embodiment of the invention.

Push button 32 can be configured in several different ways. If desired, push button 32 can be a simple push to talk button mounted on the internal circuit board 60 in the schematic diagram of FIG. 6. In such a configuration, the push button may be spring loaded to occupy a normally open state so that the microphone is muted or disconnected from the audio input circuit unless the push button is depressed to enter speech. Alternatively, the push button can be a normally closed switch which is connected to short out the microphone or mute it when the button is not depressed. Yet another alternative utilizes a momentary push button to toggle the microphone between the muted state and the active state. This can be accomplished using a simple latching type push button which selectively latches in an open state or a closed state upon successive compresses of the button. Alternatively, an electronic latching circuit can be provided to perform this function. The advantage of utilizing an electronic circuit in place of a simple mechanical switch is that the electronic circuit can be made to produce less of an audible pop, click or transient when switching is effected.

Figure 7:
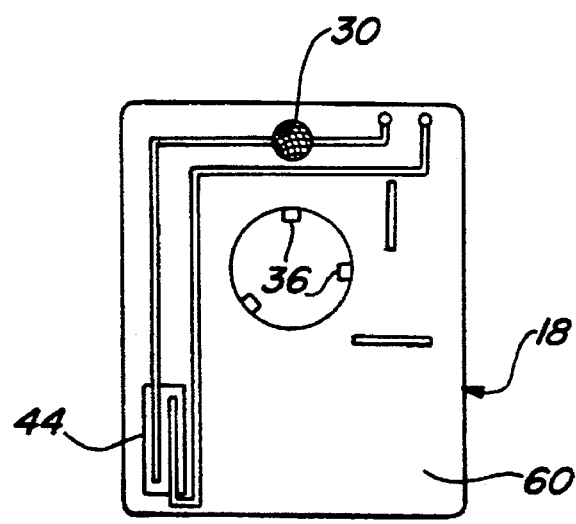
FIG. 7 depicts another alternate embodiment of the invention.

While the push to talk embodiment has been illustrated first and is presently preferred due to its simplicity and low cost, other mechanisms can be used to provide the microphone muting function. Some of these are illustrated in the remaining FIGS. 7 and 8. In FIG. 7, a mercury switch 44 is substituted for push button 32. The mercury switch is arranged so that the microphone is muted when the device 18 is placed on a substantially horizontal surface for use as a pointing device. The switch changes state to connect the microphone to the audio input when the device 18 is lifted to the position shown in FIG. 5C. Thus this embodiment automatically switches the microphone on and off, without the need for the user to depress any buttons.

Figure 8:
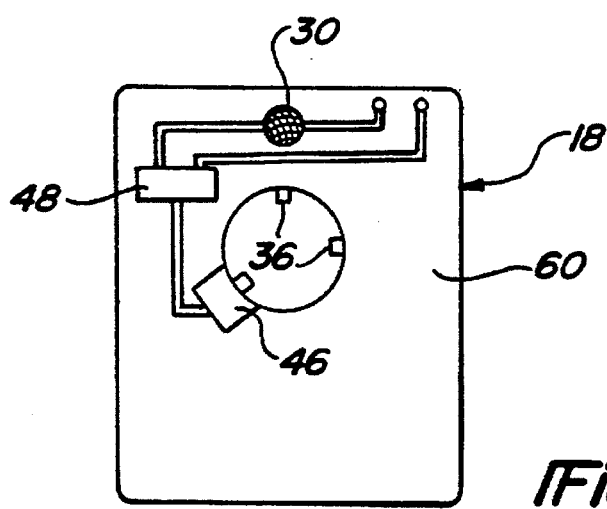
FIG. 8 depicts yet another alternate embodiment of the invention.

Another embodiment of automatic microphone switching is illustrated in FIG. 8. In this embodiment, a microswitch is provided for detecting when the device is in contact with the desktop or mousepad and when it is not. Alternatively, the microswitch can be positioned to contact the ball 26 to sense when the ball is urged upwardly due to contact with a desktop or mousepad and when it is urged downwardly, e.g., by gravity, when lifted away from the desktop surface. If an optical sensing system (e.g. with optically encoded pad) is used in place of an X-Y encoder/ball system, the loss of optical tracking signal which occurs when the pointing device is lifted away from the pad can be sensed and used as an indication that the device should switch the microphone channel on. To prevent the microphone from being momentarily switched on when the pointing device is simply being lifted to reposition it for further pointing operations, the switch may be provided with a time delay circuit. Thus in FIG. 8, microswitch 46 is coupled to delay circuit 48. Delay circuit 48 functions to activate microphone 38 after switch 46 has not been in contact with the desktop or mousepad for a predetermined time delay (e.g. 500 to 1,000 milliseconds) and to mute the microphone when contact between the switch 46 and desktop or mousepad have resumed. In other words, circuit 48 provides a delay in switching microphone 38 on but switches microphone 38 off without delay.

From the foregoing, it will be seen that the present invention provides important pointing device functions and speech or audio input functions in a single integrated package. The invention allows the speech input microphone to be held close to the mouth during speech input which greatly reduces erroneous speech recognition due to room acoustics and reverberations. The device is simple to use, economical to manufacture and will work with virtually any computer system.

Accordingly, while the invention has been described in its presently preferred forms, it will be understood that the invention is capable of modification without departing from the spirit of the invention as set forth in the appended claims.

What is claimed is:

1. A multimode computer input device comprising:
    a housing sized to be hand held and having an Underside adapted for placement on a horizontal surface;
    a pointing device disposed within said housing having mechanism for sensing changes in position of the pointing device with respect to a reference frame and for providing position change signals to a computer;
    a microphone disposed within said housing and positioned on said underside for providing audio signals to said computer; and
    mechanism coupled to said microphone for automatically inhibiting the providing of said audio signal to said computer when said device is positioned on a substantially horizontal surface for providing position change signals to said computer;
    wherein said automatic inhibiting mechanism includes a switch for sensing the angular position of said housing with respect to a fixed reference frame.

2. The input device of claim 1 wherein said pointing device comprises X-Y encoder system driven by a ball.

3. The input device of claim 1 wherein said pointing device comprises optical sensing system.

4. The input device of claim 1 further comprising push button disposed on said housing and coupled to said microphone for selectively inhibiting the providing of said audio signal to said computer.

5. The input device of claim 4 wherein said housing has an underside adapted for placement on a horizontal surface and wherein said push button is disposed on said underside.

6. The input device of claim 4 wherein said housing has a recessed portion and wherein said push button is disposed within said recess.

7. The input device of claim 1 further comprising push button disposed on said housing and coupled to said microphone for selectively permitting the providing of said audio signal to said computer.

8. The input device of claim 7 wherein said housing has an underside adapted for placement on a horizontal surface and wherein said push button is disposed on said underside.

9. The input device of claim 7 wherein said housing has a recessed portion and wherein said push button is disposed within said recess.

10. The input device of claim 1 further comprising cable system having a first end attached to said input device and having a second end for attaching to said computer, said cable system having at least one first signal conductor coupled to said pointing device for communicating said position change signals to said computer and having at least one second signal conductor for communicating said audio signals to said computer.

11. The input device of claim 1 wherein said automatic inhibiting mechanism includes a mercury switch.

12. The input device of claim 1 wherein said pointing device comprises an optical sensing system for supplying said position change signals and wherein said automatic inhibiting mechanism senses the presence and absence of said position change signals and wherein said automatic inhibiting mechanism uses the presence of position change signals to inhibit the providing of audio signals to said computer and uses the absence of position change signals to permit the providing of audio signals to said computer.

13. A multi mode computer input device comprising:
   a housing sized to be hand held and having an underside adapted for placement on a horizontal surface;
   a pointing device disposed within said housing having mechanism for sensing changes in position of the pointing device with respect to a reference frame and for providing position change signals to a computer;
   a microphone disposed within said housing and positioned on said underside for providing audio signals to said computer; and
   mechanism coupled to said microphone for automatically inhibiting the providing of said audio signal to said computer when said device is positioned on a substantially horizontal surface for providing position change signals to said computer;
   wherein said automatic inhibiting mechanism includes a switch for sensing when said housing is in resting contact with a substantially horizontal surface.

14. The input device of claim 13 wherein said pointing device comprises X-Y encoder system driven by a ball.

15. The input device of claim 13 wherein said pointing device comprises optical sensing system.

16. The input device of claim 13 further comprising push button disposed on said housing and coupled to said microphone for selectively inhibiting the providing of said audio signal to said computer.

17. The input device of claim 16 wherein said housing has an underside adapted for placement on a horizontal surface and wherein said push button is disposed on said underside.

18. The input device of claim 16 wherein said housing has a recessed portion and wherein said push button is disposed within said recess.

19. The input device of claim 13 further comprising push button disposed on said housing and coupled to said microphone for selectively permitting the providing of said audio signal to said computer.

20. The input device of claim 19 wherein said housing has an underside adapted for placement on a horizontal surface and wherein said push button is disposed on said underside.

21. The input device of claim 19 wherein said housing has a recessed portion and wherein said push button is disposed within said recess.

22. The input device of 13 further comprising cable system having a first end attached to said input device and having a second end for attaching to said computer, said cable system having at least one first signal conductor coupled to said pointing device for communicating said position change signals to said computer and having at least one second signal conductor for communicating said audio signals to said computer.

23. A multimode computer input device comprising:
   a housing sized to be hand held and having an underside adapted for placement on a horizontal surface;
   a pointing device disposed within said housing having mechanism for sensing changes in position of the pointing device with respect to a reference frame and for providing position change signals to a computer;
   a microphone disposed within said housing for providing audio signals to said computer;
   mechanism coupled to said microphone for automatically inhibiting the providing of said audio signal to said computer when said device is positioned on a substantially horizontal surface for providing position changes signals to said computer; and
   push button disposed on said underside of said housing and coupled to said microphone for selectively inhibiting the providing of said audio signal;
   wherein said automatic inhibiting mechanism includes a switch for sensing the angular position of said housing with respect to a fixed reference frame.

24. The input device of claim 23 wherein said pointing device comprises X-Y encoder system driven by a ball.

25. The input device of claim 23 wherein said pointing device comprises optical sensing system.

26. The input device of claim 23 wherein said microphone is positioned on said underside.

27. The input device of claim 23 wherein said housing has a recessed portion and wherein said push button is disposed within said recess.

28. The input device of claim 23 further comprising cable system having a first end attached to said input device and having a second end for attaching to said computer, said cable system having at least one first signal conductor coupled to said pointing device for communicating said position change signals to said computer and having at least one second signal conductor for communicating said audio signals to said computer.

29. The input device of claim 23 wherein said automatic inhibiting mechanism includes a mercury switch.

30. The input device of claim 23 wherein said mechanism wherein said automatic inhibiting mechanism includes a switch for sensing when said housing is in resting contact with a substantially horizontal surface.

31. A multimode computer input device comprising:
   a housing sized to be hand held and having an underside adapted for placement on a horizontal surface;
   a pointing device disposed within said housing having mechanism for sensing changes in position of the pointing device with respect to a reference frame and for providing position change signals to a computer;

a microphone disposed within said housing for providing audio signal s to said computer;

mechanism coupled to said microphone for automatically inhibiting the providing of said audio signal to said computer when said device is positioned on a substantially horizontal surface for providing position changes signals to said computer; and push button disposed on said underside of said housing and coupled to said microphone for selectively permitting the providing of said audio signal;

wherein said automatic inhibiting mechanism includes a switch for sensing the angular position of said housing with respect to a fixed reference frame.

32. The input device of claim 31 wherein said pointing device comprises X-Y encoder system driven by a ball.

33. The input device of claim 31 wherein said pointing device comprises optical sensing system.

34. The input device of claim 31 wherein said microphone is positioned on said underside.

35. The input device of claim 31 wherein said housing has a recessed portion and wherein said push button is disposed within said recess.

36. The input device of claim 31 further comprising cable system having a first end attached to said input device and having a second end for attaching to said computer, said cable system having at least one first signal conductor coupled to said pointing device for communicating said position change signals to said computer and having at least one second signal conductor for communicating said audio signals to said computer.

37. The input device of claim 31 wherein said automatic inhibiting mechanism includes a mercury switch.

38. The input device of claim 31 wherein said mechanism wherein said automatic inhibiting mechanism includes a switch for sensing when said housing is in resting contact with a substantially horizontal surface.

39. A multimode computer input device comprising:

a housing sized to be hand held and having an underside adapted for placement on a horizontal surface;

a pointing device disposed within said housing having mechanism for sensing changes in position of the pointing device with respect to a reference frame and for providing position change signals to a computer;

a microphone disposed within said housing for providing audio signals to said computer;

mechanism coupled to said microphone for automatically inhibiting the providing of said audio signal to said computer when said device is positioned on a substantially horizontal surface for providing position changes signals to said computer; and push button disposed on said underside of said housing and coupled to said microphone for selectively inhibiting the providing of said audio signal;

wherein said automatic inhibiting mechanism includes a switch for sensing when said housing is in resting contact with a substantially horizontal surface.

40. The input device of claim 39 wherein said pointing device comprises X-Y encoder system driven by a ball.

41. The input device of claim 39 wherein said pointing device comprises optical sensing system.

42. The input device of claim 39 wherein said microphone is positioned on said underside.

43. The input device of claim 39 wherein said housing has a recessed portion and wherein said push button is disposed within said recess.

44. The input device of claim 39 further comprising cable system having a first end attached to said input device and having a second end for attaching to said computer, said cable system having at least one first signal conductor coupled to said pointing device for communicating said position change signals to said computer and having at least one second signal conductor for communicating said audio signals to said computer.

45. The input device of claim 39 wherein said automatic inhibiting mechanism includes a mercury switch.

46. The input device of claim 39 wherein said mechanism wherein said automatic inhibiting mechanism includes a switch for sensing when said housing is in resting contact with a substantially horizontal surface.

47. A multimode computer input device comprising:

a housing sized to be hand held and having an underside adapted for placement on a horizontal surface;

a pointing device disposed within said housing having mechanism for sensing changes in position of the pointing device with respect to a reference frame and for providing position change signals to a computer;

a microphone disposed within said housing for providing audio signals to said computer;

mechanism coupled to said microphone for automatically inhibiting the providing of said audio signal to said computer when said device is positioned on a substantially horizontal surface for providing position changes signals to said computer; and push button disposed on said underside of said housing and coupled to said microphone for selectively inhibiting the providing of said audio signal;

wherein said automatic inhibiting mechanism includes a switch for sensing when said housing is in resting contact with a substantially horizontal surface.

48. The input device of claim 47 wherein said pointing device comprises X-Y encoder system driven by a ball.

49. The input device of claim 47 wherein said pointing device comprises optical sensing system.

50. The input device of claim 47 wherein said microphone is positioned on said underside.

51. The input device of claim 47 wherein said housing has a recessed portion and wherein said push button is disposed within said recess.

52. The input device of claim 47 further comprising cable system having a first end attached to said input device and having a second end for attaching to said computer, said cable system having at least one first signal conductor coupled to said pointing device for communicating said position change signals to said computer and having at least one second signal conductor for communicating said audio signals to said computer.

53. The input device of claim 47 wherein said automatic inhibiting mechanism includes a mercury switch.

54. The input device of claim 47 wherein said mechanism wherein said automatic inhibiting mechanism includes a switch for sensing when said housing is in resting contact with a substantially horizontal surface.

55. A multimode computer input device comprising:

a housing sized to be hand held and having an underside adapted for placement on a horizontal surface;

a pointing device disposed within said housing having mechanism for sensing changes in position of the pointing device with respect to a reference frame and for providing position change signals to a computer;

a microphone disposed within said housing for providing audio signals to said computer;

mechanism coupled to said microphone for automatically inhibiting the providing of said audio signal to said computer when said device is positioned on a substantially horizontal surface for providing position changes signal s to said computer; and push button disposed on said underside of said housing and coupled to said microphone for selectively permitting the providing of said audio signal;

wherein said automatic inhibiting mechanism includes a switch for sensing when said housing is in resting contact with a substantially horizontal surface.

56. The input device of claim 55 wherein said pointing device comprises X-Y encoder system driven by a ball.

57. The input device of claim 55 wherein said pointing device comprises optical sensing system.

58. The input device of claim 55 wherein said microphone is positioned on said underside.

59. The input device of claim 55 wherein said housing has a recessed portion and wherein said push button is disposed within said recess.

60. The input device of claim 55 further comprising cable system having a first end attached to said input device and having a second end for attaching to said computer, said cable system having at least one first signal conductor coupled to said pointing device for communicating said position change signals to said computer and having at least one second signal conductor for communicating said audio signals to said computer.

61. The input device of claim 55 wherein said automatic inhibiting mechanism includes a mercury switch.

62. The input device of claim 55 wherein said mechanism wherein said automatic inhibiting mechanism includes a switch for sensing when said housing is in resting contact with a substantially horizontal surface.

\* \* \* \* \*